United States Patent
Gold

[15] 3,705,542
[45] Dec. 12, 1972

[54] PHOTOGRAPHIC FILM CARTRIDGE

[72] Inventor: Nicholas Gold, Arlington, Mass.

[73] Assignee: Polaroid Corporation, Cambridge, Mass.

[22] Filed: April 21, 1971

[21] Appl. No.: 136,029

[52] U.S. Cl. ..........................................95/19, 95/13
[51] Int. Cl. ..............................................G03b 19/10
[58] Field of Search ..............................95/13, 19–30

[56] References Cited

UNITED STATES PATENTS

| | | | |
|---|---|---|---|
| 3,225,671 | 12/1965 | Friedman | 95/13 |
| 3,543,662 | 12/1970 | Erlichman | 95/19 X |
| 3,561,339 | 2/1971 | Erlichman | 95/19 X |
| 3,607,283 | 9/1971 | Gold | 95/19 X |

*Primary Examiner*—Samuel S. Matthews
*Assistant Examiner*—Richard M. Sheer
*Attorney*—Brown & Mikulka, Alfred E. Corrigan and Lawrence G. Norris

[57] ABSTRACT

This disclosure depicts film cartridges for storing a plurality of film units in stacked relationship for successive exposure in photographic cameras of the "self-developing" type. The cartridges disclosed each include a spring platen for urging a plurality of film units stacked thereon toward an exposure window in a top wall of the cartridge. A number of embodiments of devices for retaining and accurately positioning the spring platen are disclosed.

11 Claims, 5 Drawing Figures

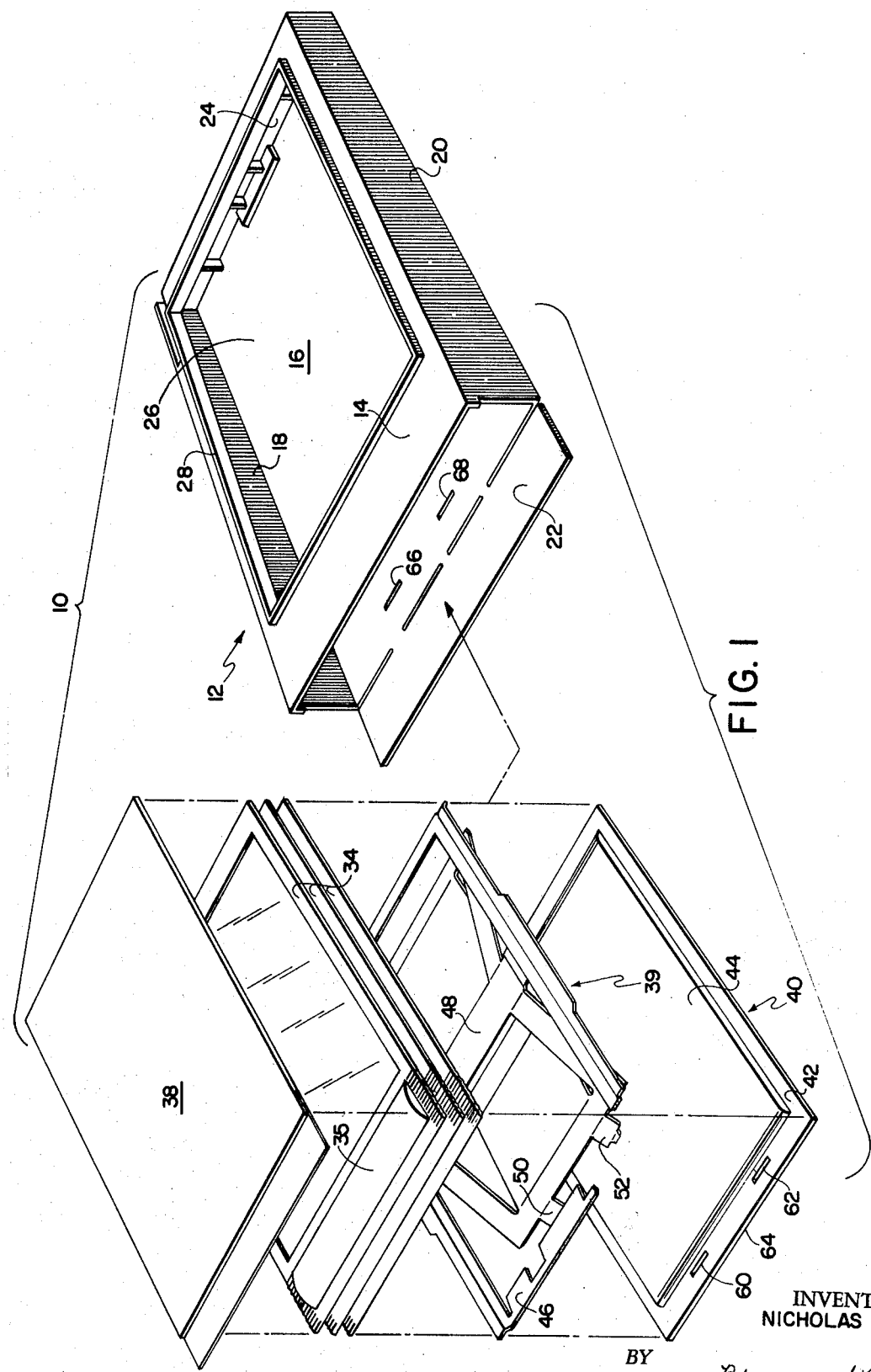

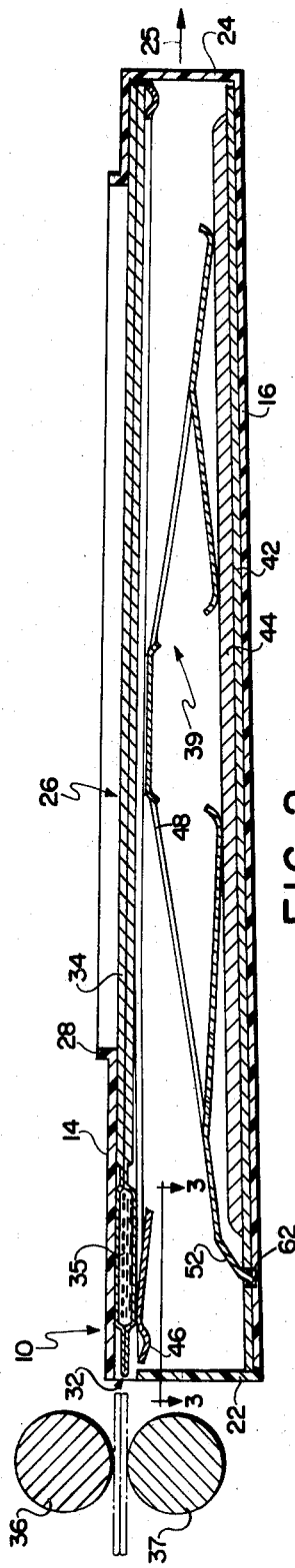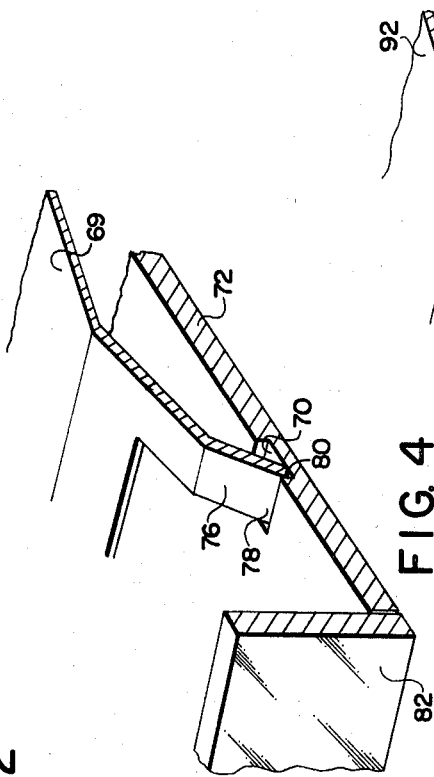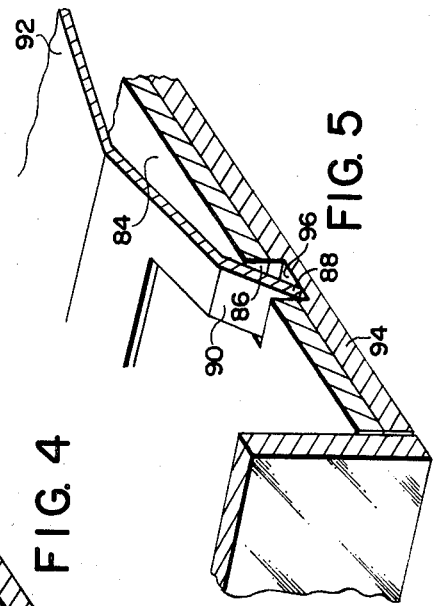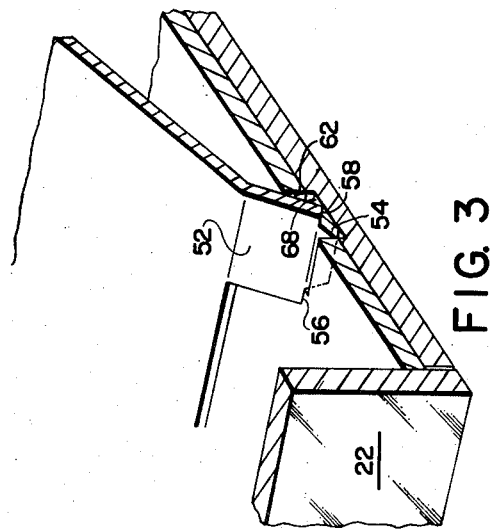

PHOTOGRAPHIC FILM CARTRIDGE

CROSS-REFERENCE TO RELATED APPLICATION

This application relates to but is not dependent upon copending application Ser. No. 784,161, filed Dec. 16, 1968, assigned to the assignee of this invention and now U.S. Pat. No. 3,595,661.

BACKGROUND OF THE INVENTION

This invention generally relates to photographic film cartridges for use in cameras of the "self-developing" type in which photosensitive materials exposed within a camera are automatically developed by a diffusion transfer process upon withdrawal from the camera. More particularly, this invention is directed to improvements in the construction of such a cartridge which is particularly useful in self-developing cameras having a general construction as shown, for example, in U.S. Pat. Nos. 3,477,437 (Tiffany) and 3,543,662 (Erlichman).

Cartridges designed for use in such cameras have spaced top, bottom and end walls. A photosensitive layer in the top-most of a stack of film units in the cartridge is exposed through a window in the cartridge top wall. To develop the latent image formed in the photosensitive layer, a film transport mechanism slides the exposed film unit off the stack and out through a slit in one end wall of the cartridge where a pair of driven rollers picks up the leading edge of the film unit.

As the film unit is pulled through the rollers, a pod on the leading end of the film unit containing processing fluid is ruptured and its contents are spread between the photosensitive layer and a receiving layer to effect development of the latent image stored in the photosensitive layer.

It is important in such cartridges: (1) that the film unit to be exposed is positioned accurately with respect to the exposure window in the top wall of the cartridge; (2) that after exposure of the last film unit in the cartridge, a spring platen employed to urge the film units successively into proper position at the cartridge exposure window is not caused to be expelled from the cartridge along with the said last film unit or thereafter in lieu of a film unit; (3) that the spring platen be held in spaced relationship from the inner wall surfaces of the cartridge in order to prevent any contact of the platen with these surfaces which might interfere with the normal operation of the platen; and (4) that any structure employed to meet the above-stated requirements not add significantly to the cost of the cartridge or obstruct in any way with the functioning of the cartridge.

OBJECTS OF THE INVENTION

It is an object of this invention to provide improved film cartridges having structures meeting fully each of the above-stated desiderata. It is thus an object to provide improved film cartridges for use in self-developing cameras of the nature above described which embody extremely low-cost means effective to accurately position and positively retain in the cartridge a spring platen which supports and successively feeds a stack of film units into an exposure location.

It is an object to provide improved means for accomplishing such positioning and retention of the spring platen without the need for any additional materials or assembly procedures. It is an object that such means accommodate and in no way interfere with the normal operation of the cartridge.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is an exploded perspective view, partly broken away, showing a photographic film cartridge embodying this invention;

FIG. 2 is a sectional view showing the FIG. 1 cartridge assembled and as it might appear during use with one film unit remaining;

FIG. 3 is a fragmentary perspective sectional view of a cut-away generally along lines 3—3 of FIG. 2; and FIGS. 4 and 5 are perspective sectional views corresponding to FIG. 3 showing other embodiments of the invention.

DESCRIPTION OF THE PREFERRED EMBODIMENTS

FIGS. 1–3 depict a preferred one of the many possible implementations of the principles of this invention. In the illustrated embodiment, a film cartridge 10 is shown as having a casing 12 (of injection molded plastic, for example) having a top wall 14, a bottom wall 16, side walls 18, 20, and end walls 22, 24. The casing 12 is tapered convergently in the direction of cartridge insertion (shown by arrow 25) in order to accommodate asymmetries in the contents of the cartridge, and in order to prevent insertion of the wrong end of the cartridge into a camera.

The top wall 14, which may be considered the forward wall of the cartridge relative to the direction of impingement of image-carrying light, defines an exposure window 26 through which scene images are formed on photosensitive materials contained within the cartridge. The exposure window 26 is surrounded by an outwardly extending mouth 28 serving to assure a proper rest position of the cartridge 10 when inserted into a camera film chamber (not shown) and to improve the light seal of the cartridge.

The casing end wall 22 is initially open during assembly of the cartridge, as shown in FIG. 1, to allow insertion of the contents of the cartridge into the casing. After insertion of the said contents, the end wall 22 is secured permanently to the casing, for example, by the use of an ultrasonic welding operation. An opening in the shape of a slit 32 formed between the upper edge of the end wall 22 and the top wall 14 of the casing permits withdrawal of film units from the cartridge.

The contents of the cartridge 10 includes a stack of film units 34 which are here shown as being of the "self-developing" type, having a pod 35 containing processing fluid which is spread between photosensitive and receiving layers to effect development of a latent image on the photosensitive layer. The spreading may be achieved by a pair of rollers 36, 37 which act to rupture the pod 35 and force the fluid contained therein in a uniform layer between the photosensitive and receiving layers.

A dark slide 38 (shown only in FIG. 1) covers the film units 34 to prevent fogging thereof prior to use of the cartridge 10.

A spring platen 39 having novel features implementing this invention acts to urge the film units 34 in succession into a proper attitude for exposure beneath the window 26. The general structure and function of the spring platen 39 are disclosed and claimed in the above-referenced copending application Ser. No. 784,161, filed Dec. 16, 1968. Improvements thereto made in accordance with this invention are described in detail below.

The cartridge 10 contains a battery 40 which is disposed on the bottom wall 16 of the casing 12 beneath the spring platen 39. In the illustrated embodiment, the battery 40 is shown as comprising a card 42, preferably of a relatively stiff cardboard or similar material, which carries an electrochemical dry cell assembly 44.

As explained briefly above, it is important in order to assure a proper location of the scene image on the image-receiving area of the uppermost film unit 34, that the stack of film units 34, and thus the spring platen 39 which supports the film units 34, be accurately positioned within the cartridge at the time of exposure. Further, the positional stability of the spring platen 39 has been found to be of particular importance as the last film unit 34 is being withdrawn from the cartridge 10. It has been found that the unloaded spring platen 39 is apt to be drawn forward by frictional forces acting between the last film unit 34 and the upper surface of the platen 39, with the effect that the leading end 46 of the platen 39 may enter or be drawn through the withdrawal slit 32 in the casing 12 and into the nip of the rollers 36, 37. This partial ejection of the spring platen 39 has also been found to produce a problem if a user attempts to effect withdrawal of a film unit 34 when the cartridge is empty.

It is an object of this invention to provide an improved cartridge having means which overcome the described problems without adding significantly to the cost of the cartridge and without in any way interfering with the normal operation at the film feeding structure in the cartridge.

These ends are met in accordance with this invention by the provision of means for accurately positioning the spring platen 39 and for retaining it against unwanted movement toward the end wall 22. A number of embodiments are shown for implementing the principles of this invention. A preferred embodiment is illustrated in FIGS. 1-3. In the FIGS. 1-3 embodiment, the spring platen 39 has a body 48 from which extends downwardly a pair of feet 50, 52. Each of the feet 50, 52 includes a tapered end portion 54 having a pair of shoulders 56, 58 at the base of the tapered portion 54.

The battery card 42 defines a pair of elongated apertures 60, 62 positioned to register with and receive the tapered end portions 54 of the feet 50, 52 but of a length which is less than the width of feet 50, 52, whereby the shoulders 56, 58 abut the top surface of the card 42 and are prevented from passing through the apertures 60, 62. By the described arrangement, the card 42 retains and effectively carries the feet 50, 52 of the spring platen 39.

The apertures 60, 62 are located in the card 42 a predetermined distance from the edge 64 of the card 42 which abuts the end wall 22 of the casing 12 (see FIG. 2). This predetermined distance is selected to be such that the spring platen 39 effects a proper positioning of the film units beneath the exposure window 26 during exposure of the film units 34, and the spacing of the spring platen 39 from the end wall 22 prevents an inadvertent withdrawal or ejection of the leading end 46 of the platen 39 from the cartridge 10.

In accordance with this invention, a pair of depressions 66, 68 are provided in the upper surface of the bottom wall 16 of the casing 12. The depressions 66, 68 are positioned to register with the tips of the tapered end portions 54 of the feet 50, 52 such that the tips may pass completely through the apertures 60, 62 in the card 42, thereby precluding any possibility that the feet 50, 52 might be lifted out of the apertures 60, 62 and thereby escape from retentive capture by the card 42.

The depressions 66, 68 also assure than when the cartridge is fully loaded, the spring occupies a predetermined minimum amount of space inside the cartridge. This is an important factor since when the cartridge is fully loaded, the interior of the cartridge is substantially completely occupied.

Further, the provision of the depressions 66, 68 assures that the spring is in a predetermined state of stress and exerts the desired loading forces on the battery assembly 44.

The provision of a pair of laterally spaced feet 50, 52 captured in a pair of correspondingly spaced apertures 60, 62 acts to provide anti-rotational stability for the card 42 and thus for the spring platen 39.

The objects of this invention are achieved without adding significantly to the manufacturing cost of the cartridge. The depressions 66, 68 are formed during injection molding of the casing 20, and thus result in essentially no additional cost. The feet 50, 52 on the spring platen 39 are integral with the platen 39 and are formed without adding to the cost of the platen merely by altering the configuration of the die cutting and stamping tools. The apertures 60, 62 in the battery card 42 are formed during the card die cutting operation.

Further, the means provided for implementing this invention do not in any way increase the necessary assembly operations, either in number or complexity. To load the cartridge 12, the cartridge contents are aligned in a fixture, compressed, and inserted into the casing 12 with the end wall 22 in its open position as shown in FIG. 1. As the assembly of contents nears its final rest position, the end portions 54 of the feet 50, 52 snap into the depressions 66, 68, signaling a proper positioning of the contents in the cartridge. To complete the cartridge assembly, the end wall 22 is attached to the body 12 of the casing 12, for example, by an ultrasonic welding operation.

Further, by this invention a firm and stable support for the spring platen 39 (and for the film units 34 supported thereon) is provided by the pair of feet 50, 52 retained securely in the apertures 60, 62 in the card 42. The pivoting action provided by the containment of the feet 50, 52 by the card 42 allows the spring platen 39 to alter its state of flexure without encumberance.

By this invention, the positional accuracy of the location of spring platen 39 and thus the film units 34 in the cartridge, may be held to 0.010 inch or less.

A second embodiment of the invention is shown in FIG. 4. This embodiment is adapted for use in a film cartridge which is not provided with a battery card 42. In the FIG. 4 embodiment accurate positioning of a spring platen 69 and retention thereof against unwanted forward movement is provided by depressions (one of which is shown at 70) in the upper surface of a bottom wall 72 of a cartridge. As in the FIGS. 1–3 embodiment, the spring platen 69 preferably has a pair of feet (one of which is shown at 76) which are received in the depressions 70. The feet 76 each have an end portion 78 which is angled obliquely with respect to the bottom wall 72 and which abut forward surfaces (one of which is shown at 80) in the depressions 70 to delimit the movement of the spring platen 69 in a direction toward an end wall 82 of the cartridge.

FIG. 5 depicts yet another embodiment of the invention which is similar to the FIG. 4 embodiment but which accommodates a card 84 (for example, a battery card similar to the card 42 shown in the FIGS. 1–3 embodiment). In the FIG. 5 embodiment, the card 84 is provided with apertures 86 which loosely receive and pass end portions 88 of feet 90 comprising part of a spring platen 92, which may be a general construction as shown in FIGS. 1–3. A cartridge bottom wall 94 defines depressions 96, which may be similar to the depressions 70 in the FIG. 4 embodiment, acting to retentively receive the end portions 88 of feet 90. In the FIG. 5 embodiment, as in the FIG. 4 embodiment, the positioning and retention of the spring platen 92 is accomplished by the location and construction of the depressions 96 in the bottom wall 94.

Thus, by this invention, means are provided for accurately positioning film units within a film cartridge, which means act also to preclude inadvertent withdrawal or ejection of a spring platen from the cartridge. Further, these ends are achieved with means which add little or nothing to the cost of the film cartridge. The accurate positioning of a spring platen within a cartridge also assures that the forward and rear ends of the bed of the spring platen do not contact the casing and thereby interfere with the normal operation of the spring platen.

The invention is not limited to the particular details of construction of the embodiments depicted, and it is contemplated that various and other modifications and applications will occur to those skilled in the art.

For example, the configuration of the end portions of the spring platen feet and of mating depressions may be such as to predetermine the rearward limit of travel of the spring platen as well as its forward limit of travel. Rather than locating the described depressions in the bottom wall of the casing, depressions may be located on one or more of the other casing walls in addition to the or in lieu of the bottom wall. Projection means other than feet extending downwardly from the body of the platen would, of course, be provided to mate with such other depressions. Rather than using depressions in the wall of the casing to determine the limit of movement of the spring platen (as in the FIGS. 4 and 5 embodiments, for example) it is within the compass of this invention to provide instead projections above the surface of a casing wall which are engaged by spacing means on a spring platen (or equivalent) to set the limit or limits of movement of the spring platen. Rather than using a battery comprising a full length card which supports a cell assembly as shown in the FIGS. 1–3 embodiment, a battery might be devised having a strip at one end containing apertures which receive feet on the spring platen. Numerous modifications of the disclosed spring platen, battery, and casing structures are contemplated.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A film cartridge for storing a plurality of film units in stacked relationship for successive exposure in a photographic camera comprising:

a casing having spaced walls including a top wall, an end wall having a withdrawal opening therein through which the film units are withdrawn, and a bottom wall having on its inner surface at least one depression; and spring platen means disposed within said casing beneath the film units and supported by said bottom wall for urging film units stacked thereon toward said top wall, said spring platen means having a body and foot means extending downwardly from said body and positioned thereon so as to be received in said depression in said bottom wall of said casing during such urging for preventing movement of said body toward said end wall during movement of a film unit through said withdrawal opening.

2. A film cartridge for storing a plurality of film units in stacked relationship for successive exposure in a photographic camera comprising:

a casing having spaced walls including a top wall, an end wall having a withdrawal opening therein through which the film units are withdrawn, and a bottom wall having on its inner surface at least one depression;

spring platen means disposed within said casing beneath the film units and supported by said bottom wall for urging film units stacked thereon toward said top wall, said spring platen means having a body and foot means extending downwardly from said body and positioned thereon so as to be received in said depression in said bottom wall of said casing; and battery means comprising a card supporting dry cell means located within said casing beneath said spring platen means, said card having at least one aperture therein positioned to register with said depression in said bottom wall of said casing and wherein said foot means passes through said aperture in said card and into said depression in said bottom wall, said aperture being located in said card a predetermined distance from an end edge abutting said end wall which is effective to position the film units in said casing and to space said spring platen means away from said end wall and thereby preclude entrance of any portion of said spring platen means into said withdrawal opening in said end wall of said casing.

3. The cartridge defined by claim 2 wherein said foot means includes a tapered end portion having at least one shoulder at the base of said tapered portion, said aperture in said card being of a length capable of passing said tapered end portion while blocking passage of said shoulder, whereby said card acts to carry said foot means, the tip of said tapered end portion passing through said card and into said depression.

4. The cartridge defined by claim 2 wherein said foot means on said spring platen means comprises two laterally spaced feet, wherein said bottom wall has two depressions registered with said feet, and wherein said card has a pair of apertures registered with said feet, the duality of said feet, depressions and card apertures providing anti-rotational stability for the card and thus for said spring platen means.

5. The cartridge defined by claim 1 wherein said foot means has at least an end portion angled obliquely with respect to said bottom wall of said casing, and wherein said depression has a surface for engaging said end portion of said foot means to limit movement of said spring platen means in a direction toward said end wall through which said film units are withdrawn.

6. A film cartridge for storing a plurality of film units in stacked relationship for successive exposure in a photographic camera comprising:
   a casing having spaced walls including a top wall, an end wall having a withdrawal opening therein through which the film units are withdrawn, and a bottom wall having on its inner surface at least one depression;
   spring platen means disposed within said casing beneath the film units and supported by said bottom wall for urging film units stacked thereon toward said top wall, said spring platen means having a body and foot means extending downwardly from said body and positioned thereon so as to be received in said depression in said bottom wall of said casing; and
   battery means comprising a card supporting dry cell means, located in said casing beneath said spring platen means, said card having at least one aperture therein positioned to be registrable with said depression in said bottom wall of said casing, wherein said foot means passes through said aperture in said card so as to thereby position said card relative to said spring platen means, wherein said foot means has at least an end portion angled obliquely with respect to said bottom wall of said casing, and wherein said depression has a surface for engaging said end portion of said foot means to limit movement of said spring platen means in a direction toward said end wall through which said film units are withdrawn.

7. A photographic film cartridge, comprising:
   a casing having spaced walls including a top wall, an end wall having a withdrawal opening therein, and a bottom wall;
   a plurality of film units disposed in stacked relationship in said casing for successive withdrawal from said casing through said withdrawal opening in said end wall;
   spring platen means disposed within said casing beneath said film units and supported by said bottom wall for urging said film units toward said top wall of said casing; and
   battery means within said casing including spacing means for engaging said spring platen means and retaining said platen means against movement relative to said battery means beyond a predetermined limit in a direction toward said end wall, said battery means engaging said casing to limit the movement of said battery means relative thereto in said direction toward said end wall, said spacing means effecting a predetermined position in said casing of said spring platen means and thus of said film units supported thereon.

8. A photographic film cartridge comprising:
   a casing having spaced walls including a top wall, an end wall having a withdrawal opening therein, and a bottom wall;
   a plurality of film units disposed in stacked relationship in said casing for successive withdrawal from said casing through said withdrawal opening in said end wall of said casing;
   spring platen means disposed within said casing beneath said film units and supported by said bottom wall for urging said film units toward said top wall of said casing, said spring platen means having a body and foot means extending downwardly therefrom, said foot means having a tapered end portion and including shoulder means at the base of said tapered portion; and
   battery means within said casing including a relatively stiff card, said card containing at least one aperture positioned to register with and retentively receive said foot means on said spring platen means, said aperture having a predetermined length selected to pass said tapered end portion while blocking passage of said shoulder means;
   said card engaging said casing to limit the movement thereof in a direction toward said end wall, said aperture being located in said card such as to effect a proper positioning in said casing of said spring platen means and thus of said film unit supported thereon.

9. A photographic film cartridge, comprising:
   a casing having spaced walls including a top wall, an end wall having a withdrawal opening therein, and a bottom wall having on its inner surface at least one depression;
   a plurality of film units disposed in stacked relationship in said casing for successive withdrawal from said casing through said withdrawal opening in said end wall of said casing;
   spring platen means disposed within said casing beneath said film units and supported by said bottom wall for urging said film units toward said top wall of said casing, said spring platen means having a body and foot means extending downwardly from said body; and
   battery means comprising a card supporting dry cell means, said card having at least one aperture therein positioned to register with said depression in said bottom wall of said casing, said foot means of said spring platen means being positioned on said body and adapted to pass through said aperture in said card into said depression in said bottom wall, said aperture being located in said card a predetermined distance from an end edge of said card abutting said end wall which is effective to position said film units in said casing and to space said spring platen means away from said end wall and thereby preclude entrance of any portion of said spring platen means into said withdrawal opening in said end wall, the provision of said depression assuring passage of said foot means through said card and the capture of said spring platen means by said card.

10. The cartridge defined by claim 9 wherein said foot means includes a tapered end portion having at least one shoulder at the base of said tapered portion, said aperture in said card being of a length capable of passing said tapered end portion while blocking passage of said shoulder, whereby said card acts to carry said spring platen means, the tip of said tapered end portion passing through said card and into said depression.

11. The cartridge defined by claim 10 wherein said foot means on said spring platen means comprises two laterally spaced feet, wherein said bottom wall has two depressions therein registered with said feet, and wherein said card has a pair of apertures registered with said feet, the duality of said feet, depressions and card apertures providing anti-rotational stability for the card and thus for said spring platen means.

* * * * *